United States Patent [19]

Ledinh et al.

[11] Patent Number: 4,897,881
[45] Date of Patent: Jan. 30, 1990

[54] OPTIMUM FAST TEXTURAL FEATURE EXTRACTOR

[75] Inventors: Chon T. Ledinh, Brossard; Vincent Lacasse, Montréal; Paul Cohen, Cote St-Luc, all of Canada

[73] Assignee: Centre de Recherche Industrielle du Quebec, Quebec, Canada

[21] Appl. No.: 172,229

[22] Filed: Mar. 23, 1988

[51] Int. Cl.$^4$ .......................... G06K 9/52; G06K 9/46; G06K 9/66
[52] U.S. Cl. ....................................... 382/28; 382/16; 382/27; 382/43
[58] Field of Search ....................... 382/43, 41, 28, 27, 382/52, 16, 19

[56] References Cited

U.S. PATENT DOCUMENTS 3,859,515  1/1975  Radcliffe ................................ 382/43
4,134,134  1/1979  Lux ........................................ 382/43
4,621,337  11/1986  Cates ..................................... 382/43

OTHER PUBLICATIONS

Yamasaki et al: "Basic Equation of Automatic Normalizer for Character Patterns Using Moments"—Electronics & Comms. in Japan—vol. 55-D; No. 5—1972.
Cohen: "Classification of Natural Textures . . . "—IEEE Transactions on Acoustics, Speech and Signal Processing—Jan. 89—pp. 127-128.

Primary Examiner—Reinhard J. Eisenzopf
Assistant Examiner—Jose M. Solis
Attorney, Agent, or Firm—Oblon, Spivak, McClelland, Maier & Neustadt

[57] ABSTRACT

The invention relates to a textural parameter extractor for classification or learning. Four (4) simple 2D optimum masks independent of image, are applied to four adjacent pixels in order to diagonize the associated covariance matrice. The first three (3) central moments, namely absolute deviation, standard deviation and skewness for each transformed image constitute a feature vector of twelve (12) components for classification purposes. Parallel and Sequential structures are also presented for fast textural feature extractor applications.

20 Claims, 6 Drawing Sheets

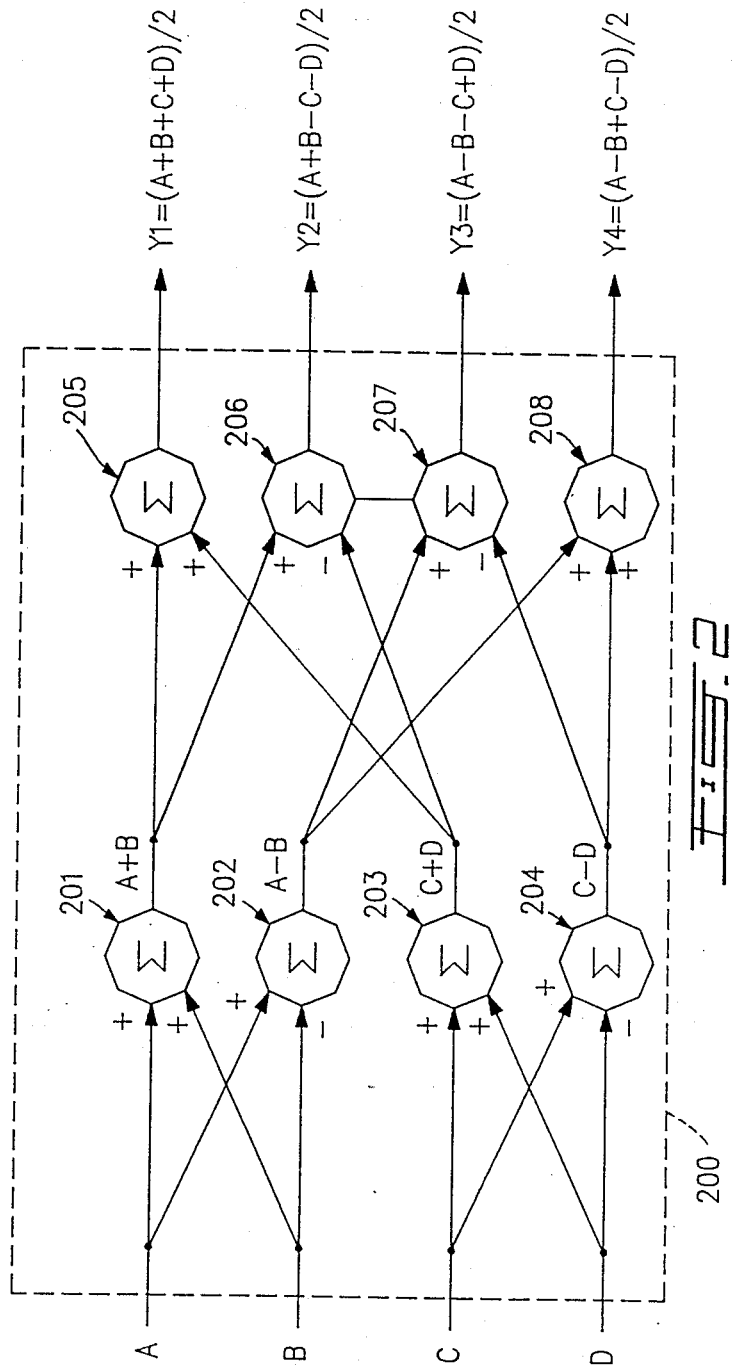

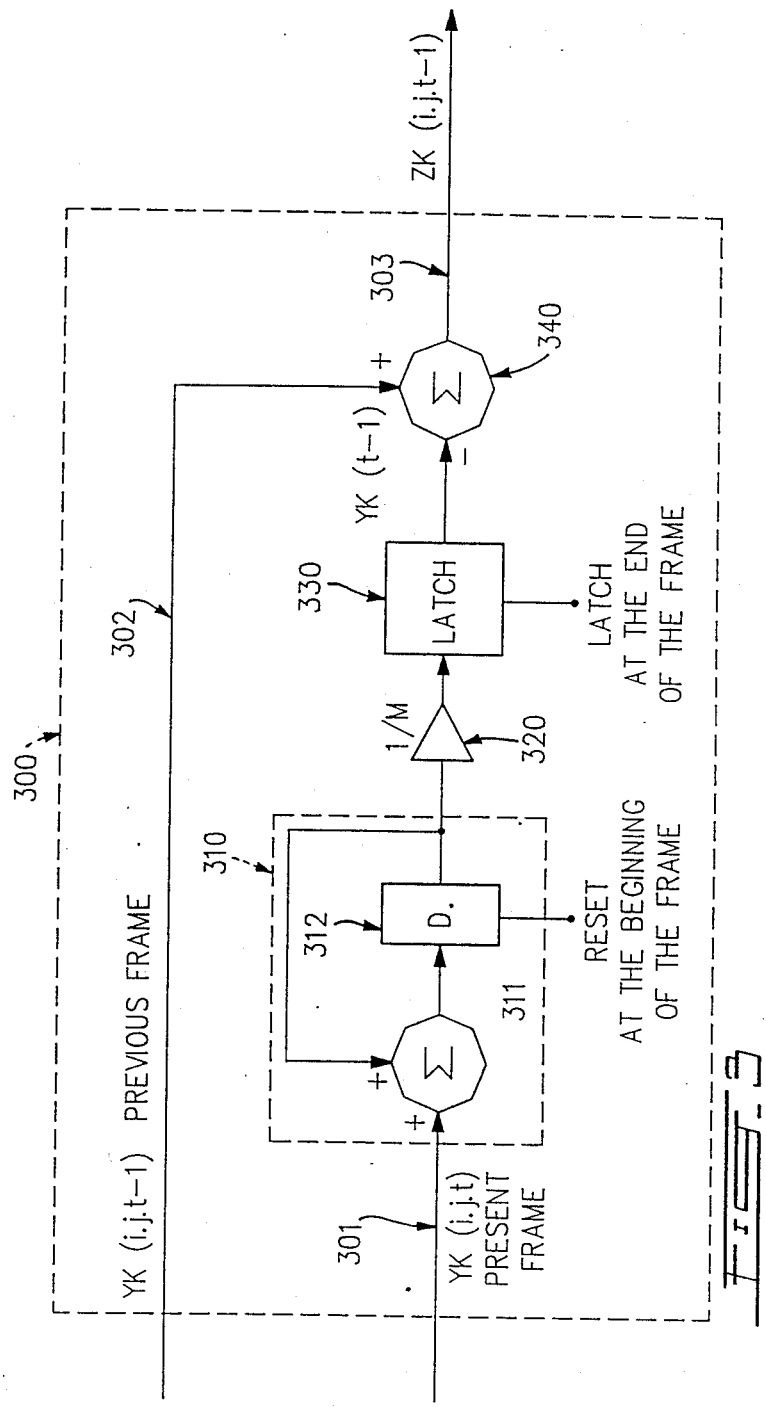

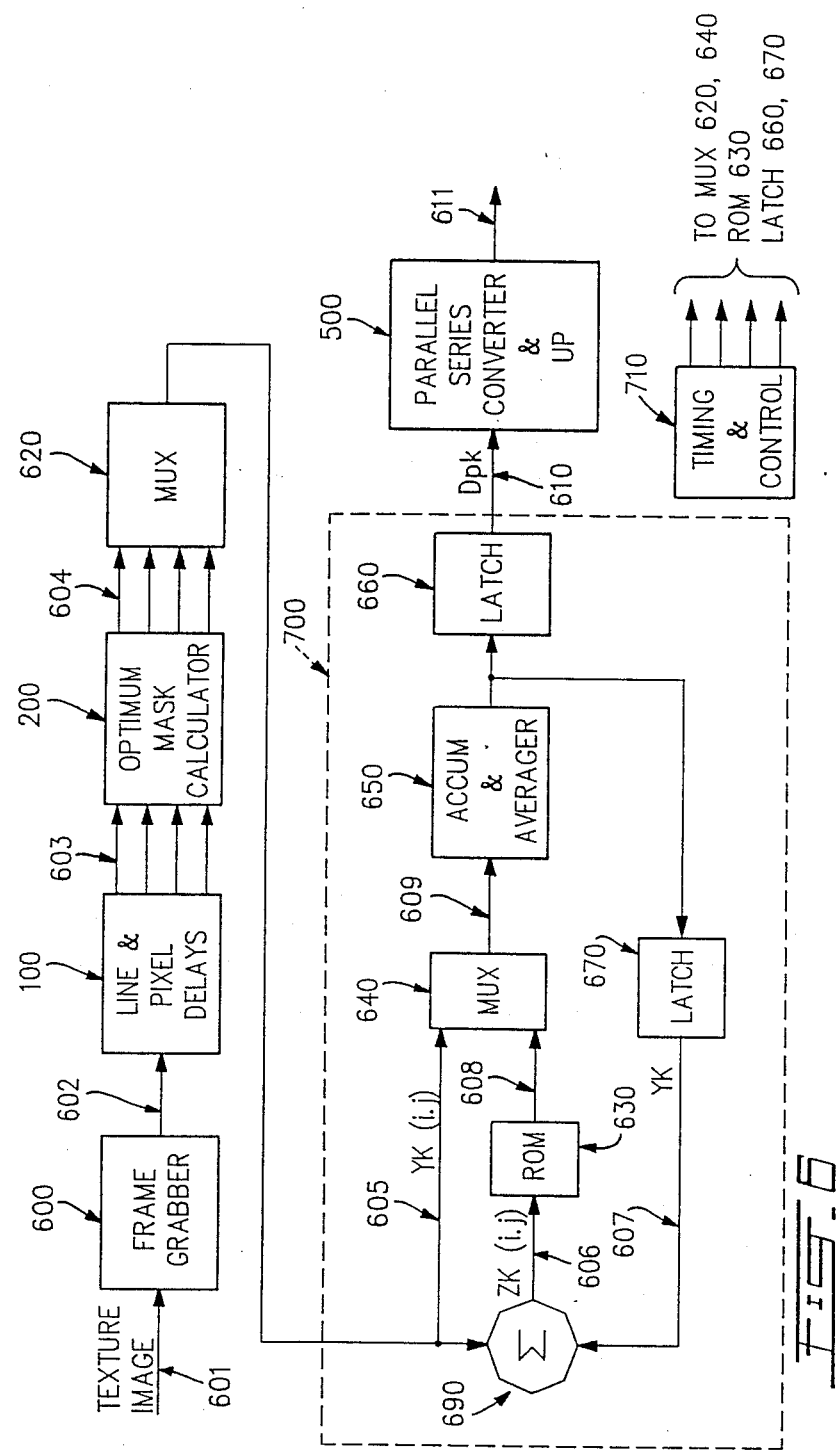

OPTIMUM FAST TEXTURAL FEATURE EXTRACTOR

BACKGROUND OF THE INVENTION (A) Field of the Invention

The present invention relates to a digital circuit for textural feature extraction or texture classification.

(B) Description of Prior Art

In recent years many different techniques have been proposed for texture classification.

The classical Gray Tone Spatial Dependence Matrices GTSDM as disclosed in an article by R. M. Haralick, K. Shannugan, I. Dinstein, entitled "TEXTURAL FEATURES FOR IMAGE CLASSIFICATION", IEEE Trans. Syst., Man. Cybern, vol. SMC 8, pp. 10–621, November 1983, is perhaps one of the most popular algorithms for texture feature extraction. However, because of its voluminous data requirements, the method becomes economically unfeasible for high speed applications.

In an article entitled "Texture Energy Measures" by Kenneth I. Laws, in Proc. Image Understanding Workshop, pp. 47-51, November 1979, Laws teaches the use of some filters of dimension 3×3 or 5×5 for matching edges, spots, lines, ripple, etc. Although good results have been obtained, this approach is heuristic. The filter set is either incomplete or not mutually orthogonal.

In a recent article by Michael Unser, entitled "Sum and Difference Histograms for texture classification", IEEE Trans. on Pattern Analysis and Machine Intelligence, vol. PAMI-8, no. 1, pp. 118-125, January 1986, Unser introduces the sum and the difference transformations for a pair of picture elements along a given direction. These transformations reduce the computational time and memory storage requirements compared to the Gray Tone Spatial Dependence Matrices (GTSDM). However, this method is conceptually equivalent to the GTSDM one by using a pair of picture elements.

SUMMARY OF INVENTION

It is a feature of the present invention to provide an optimal textural feature extractor by using a class of two dimensional four (4) picture elements.

Another feature of the invention is to provide a real time device for extraction and storage of texture parameters.

A still further feature of the invention is to provide a fast and effective device for texture classification.

According to the above features from a broad aspect, the present invention comprises a processing system and a method of analyzing textural features of a texture image, such as on the CRT of a computer terminal. The system comprises a calculator circuit for producing four picture transformed signals which are mutually uncorrelated. Deviation and moment calculators analyze each of the transformed signals by measuring the three central moments thereof and generating signal parameters representative of the texture image. A processing circuit is utilized in classification mode for calculating discriminent functions from the signal parameters assumed to be normally distributed.

A preferred embodiment of the present invention will now be described with reference to examples illustrated in the accompanying drawings in which;

FIG. 2 illustrates, in block form, a calculation of the optimum masks;

FIG. 3 is a block diagram of a pixel deviation calculator for each mask output;

FIG. 6 is a block diagram of another proposed texture parameter extractor using sequential calculation techniques.

DESCRIPTION OF PREFERRED EMBODIMENTS

Figure 1A:
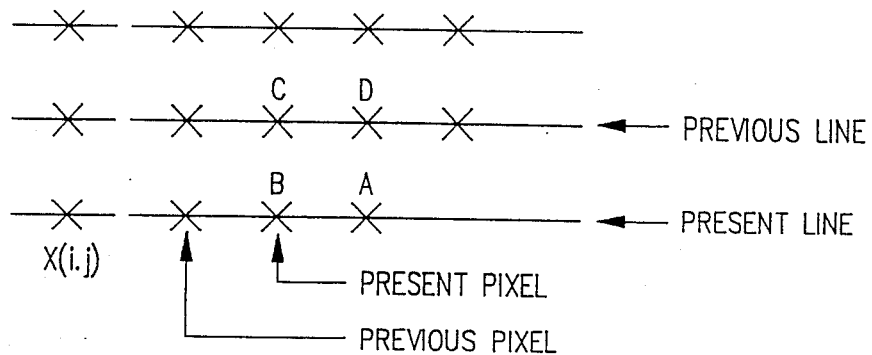
FIGS. 1A and 1B illustrate the rectangle of four (4) picture elements for texture analysis.
Figure 1B:
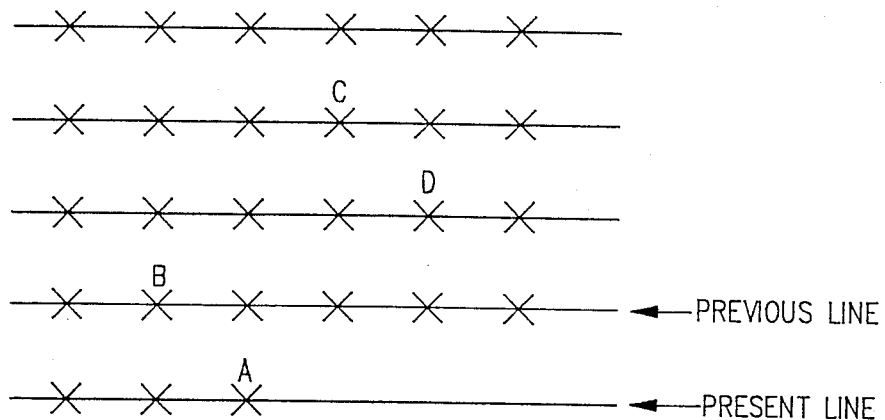

Referring now to the drawings, FIGS. 1A and 1B describe the class of four (4) picture elements (pixels) used for texture analysis. In general, the chosen pixels form a rectangle as illustrated in FIG. 1B. A special but important case, described in FIG. 1A, is the square of four (4) adjacent pixels namely A, B, C, and D. For the sake of simplicity the following covariance matrix will be given only for the special case of adjacent pixels.

Let $(X(i,j); i=1, \ldots, I; j=1, \ldots, J)$ be a two dimensional stationary and ergodic random field, in which the discrete variable $X(i,j)$ represents intensity of pixel $(i,j)$. The covariance matrix associated with the four (4) chosen pixels given by:

$$C = \sigma^2 \begin{vmatrix} 1 & a & b & c \\ a & 1 & c & b \\ b & c & 1 & a \\ c & b & a & 1 \end{vmatrix}$$

in which $\sigma^2 = E[X(i,j) - \mu^2]$ \hfill (3)

$\mu = E[X(i,j)]$ \hfill (2)

and a, b, c represent three normalized covariances appropriate to a pair of random variables $X(i+p, j+q)$ and $X(i,j)$.

The covariance matrix C in equation (1) can be diagonalized by the following matrix:

$$W = \frac{1}{2} \begin{vmatrix} 1 & 1 & 1 & 1 \\ 1 & 1 & -1 & -1 \\ 1 & -1 & -1 & 1 \\ 1 & -1 & 1 & -1 \end{vmatrix} \quad (4)$$

In other words, the four new random variables $Y_1$, $Y_2$, $Y_3$ and $Y_4$ resulted from the Walsh Hadamard transform (4) of four chosen pixels, are uncorrelated. One has the following properties:

$$\begin{aligned} \text{Var}(Y_1) &= \sigma^2(1 + a + b + c) \\ \text{Var}(Y_2) &= \sigma^2(1 + a - b - c) \\ \text{Var}(Y_3) &= \sigma^2(1 - a - b + c) \\ \text{Var}(Y_4) &= \sigma^2(1 - a + b - c) \end{aligned} \quad (5)$$

$$\text{Cov}(Y_i, Y_j) = 0, \; i \neq j \quad (6)$$

Furthermore, it is well known that the Walsh Hadamard functions are orthonormal and complete.

The transformed random variable $Y_1$, $Y_2$, $Y_3$ and $Y_4$ can be obtained by the following equation:

$$Y_1 = (A + B + C + D)/2$$
$$Y_2 = (A + B - C - D)/2 \quad (7)$$
$$Y_3 = (A - B - C + D)/2$$
$$Y_4 = (A - B + C - D)/2$$

where A, B, C, and D are the four chosen pixel intensities.

Referring now to the drawings, FIG. 2 illustrates a real time calculator for the optimum masks, i.e., equation (7). This calculator 200 consists of eight (8) combiners 201, 202, 203, 204, 205, 206, 207 and 208. The calculator parallel inputs are A, B, C, D. The outputs of the four combiners 201, 202, 203 and 204 are respectively: A+B, A−B, C+D, C−D which are in turn the inputs in an appropriate manner, of the combiners 205, 206, 207 and 208. The optional division by 2 at each output of the last four combiners can be accomplished by rounding off, i.e. forgetting the output least significant bit.

The Walsh Hadamard equation (7) yields four (4) pictures of transformed signals or coefficients $Y_k(i,j)$; $k=1, \ldots, 4$; $i=1, \ldots, I$; $j=1, \ldots, J$.

In order to reduce this amount of information for storage and/or classification, the following measures shall be obtained for each random variable $Y_k$:

Absolute deviation mean:

$$D_{1k} = \frac{1}{M} \sum_{i=1}^{L} \sum_{j=1}^{J} |Y_k(i,j) - \overline{Y}_k| \quad (8)$$

Variance:

$$D_{2k} = \frac{1}{M} \sum_{i=1}^{L} \sum_{j=1}^{J} (Y_k(i,j) - \overline{Y}_k)^2 \quad (9)$$

Third Central Moment:

$$D_{3k} = \frac{1}{M} \sum_{i=1}^{L} \sum_{j=1}^{J} (Y_k(i,j) - \overline{Y}_k)^3 \quad (10)$$

where the mean $\overline{Y}_k$ and M number of textural pixels to be considered are given respectively by:

$$\overline{Y}_k = \frac{1}{M} \sum_{i=1}^{L} \sum_{j=1}^{J} Y_k(i,j) \quad (11)$$

$$M = IJ \quad (12)$$

In other words, equations (8), (9), (10) describe the first three (3) central moments of the transformed image first order histogram. Since the four (4) chosen pixels contain already 2D information, our experience has shown that, contrary to existent techniques, it is not necessary to deal with (space/time consuming) second-order distributions for obtaining good results (about 99% for correct classification).

Figure 4:
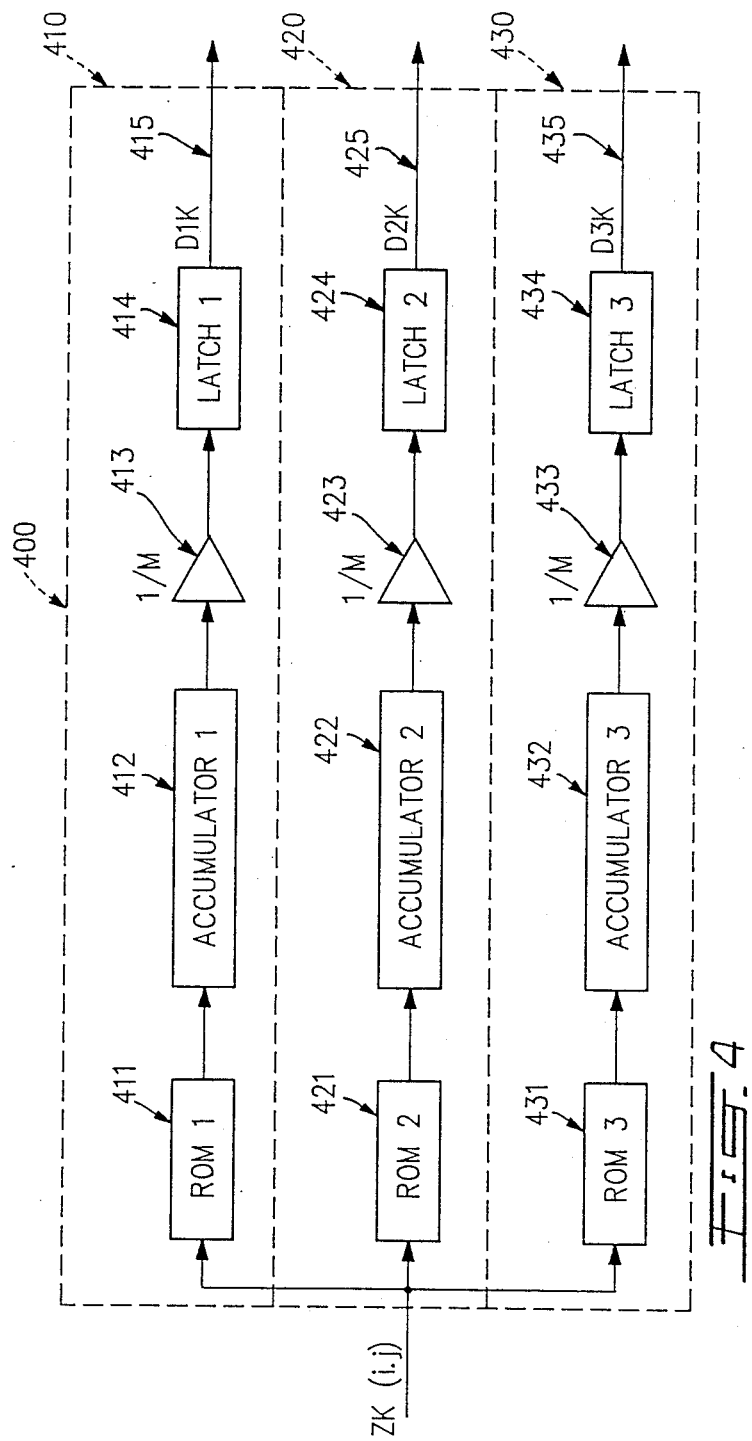
FIG. 4 is a block diagram of a generator of the first three (3) central moments for classification.

FIGS. 3 and 4 illustrate the necessary calculation for the first three central moments of each transformed random variable $Y_k$.

Referring now to the drawings, FIG. 3 describes a block-diagram of a real time transformed pixel deviation calculator. Let the indice t denote the present frame or the present texture image; consequently t−1 identifies the previous frame. The pixel deviation calculator output 303 is given by:

$$Z_k(i,j; t-1) = Y_k(i,j; t-1) - \overline{Y}_k(t-1) \quad (13)$$

the common term in equations (8), (9), (10) in which the indice t−1 has been omitted.

In order to obtain the pixel deviation $Z_k(i,j)$, it is necessary to calculate firstly the mean $\overline{Y}_k$ given by equation (11). Thus, the real time pixel deviation calculator 300 in FIG. 3 has two (2) inputs 301 and 302, namely $Y_k(i,j;t)$ and $Y_k(i,j; t-1)$ which correspond respectively to the present and the previous frame. The calculator 300 consists mainly of an accumulator 310, an averager 320, a latch 330 and a subtractor 340. The accumulator 310 contains a combiner 311 and a D flip-flop register 312. The register output is sent, in feedback, to the combiner 311. The averager 320 represents a rounding-off function if M, the number of considered pixels, equals exactly $2^m$, where m in turn is an integer. In other cases, for example: $M = 48 \times 48 = 9 \times 2^8$ the averager consists of a rounding and a ROM.

The accumulator 310 and the averager 320 are used to calculate the mean $\overline{Y}_k(t)$ while the latch 330 preserves the previous mean $\overline{Y}_k(t-1)$. Finally, the subtractor 304 yield the pixel deviation $Z_k(i,j;t-1)$ from two inputs $Y_k(i,j;t-1)$ and $\overline{Y}_k(t-1)$.

FIG. 4 illustrates a generator block-diagram for the first three (3) central moments $D_{1k}$, $D_{2k}$, $D_{3k}$ given in equations (8), (9), (10). The generator 400 contains three (3) parallel branches 410, 420, 430 which calculate respectively the moments $D_{1k}$, $D_{2k}$, $D_{3k}$. In general, each branch consists of a read only memory (ROM), an accumulator, an averager, and a latch. The ROM 1, 2 and 3 labelled 411, 421, 431 are used respectively for the following operations absolute value, power of 2 (square) and cubic power analysis.

The accumulators 412, 422, 432 are similar to that 310 in FIG. 3 previously described. The latches 414, 424, 434 are used for holding the calculated moments.

In order to avoid the truncation or overflow problem the following table summarizes element bit length in function of moment order p.

| | | BIT LENGTH OF | | | | |
|---|---|---|---|---|---|---|
| p | $Y_k$ | Accum. 310 | Latch 330 | $Z_k$ | ROM 4kl Output | Accum. 4k2 | $D_{Pk}$ |
| 1 | n+2 | n+2+m | n+2 | n+3 | n+2 | n+2+m | n+2 |
| 2 | n+2 | n+2+m | n+2 | n+3 | 2(n+2) | 2(n+2)+m | 2(n+2) |
| 3 | n+2 | n+2+m | n+2 | n+3 | 3(n+2)+1 | 3(n+2)+1+m | 3(n+2)+1 | where n denotes the pixel bit length and m is the smallest integer greater or equal to log M/log 2.

Figure 5:
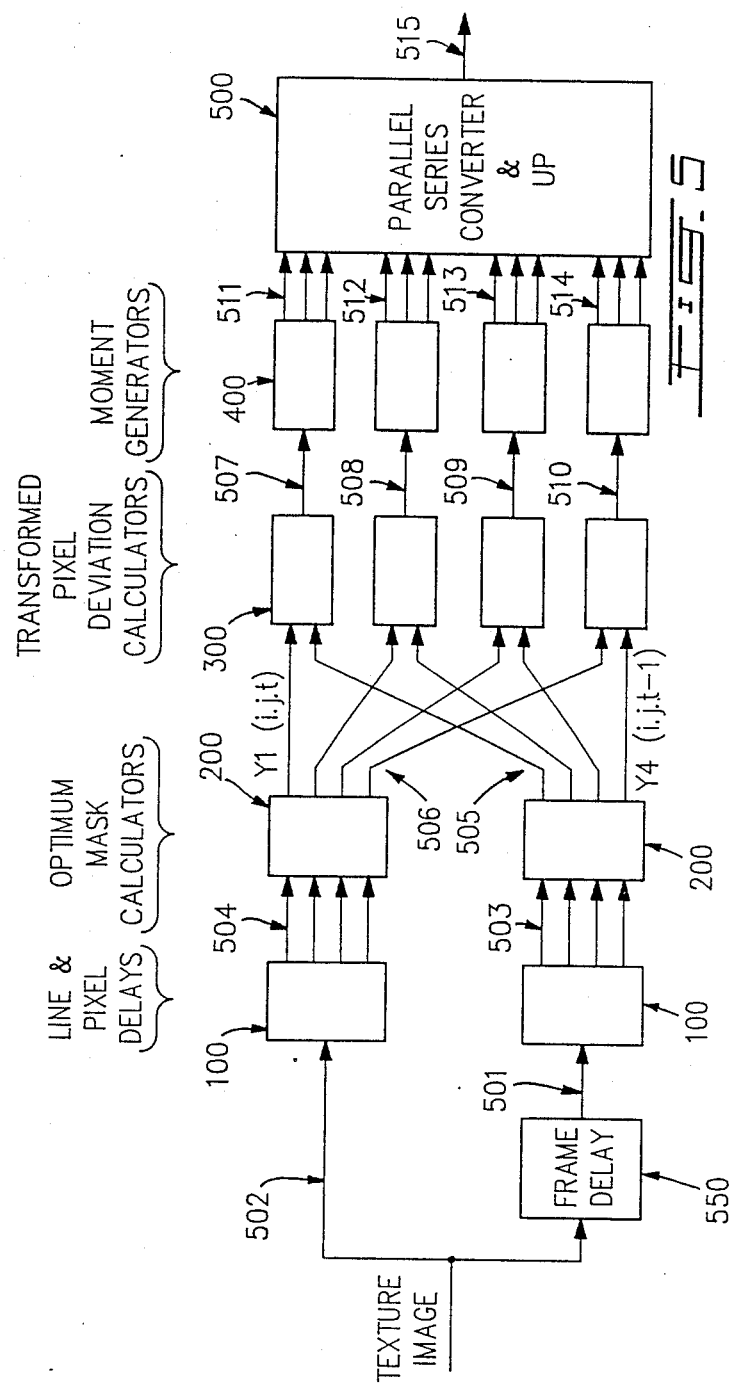
FIG. 5 is a block diagram of the proposed real time parameter extractor for texture classification.

Referring to the drawings, FIG. 5 describes the proposed configuration for real time texture parameter extraction. It contains principally a frame delay 550, two (2) line & pixel delays 100, two (2) optimum mask calculators 200, four (4) transformed pixel deviation calculators 300, four (4) moment generators and a micro-processor 500 for texture classification and/or learning. As previously mentioned, it is necessary to obtain the mean value $\overline{Y}_k$ before the calculation of transformed pixel deviation. It is the "raison d'être" of frame delay 550. In fact, if the input 502 denotes the texture image of the present frame $X(i,j;t)$, its output 501 will be $X(i,j;t-1)$ the previous texture image. The line and pixel delays 100 are used to obtain necessary parallel outputs for mask calculators 200. The outputs 504 are $A(i,j;t)$, $B(i,j;t)$, $C(i,j;t)$ and $D(i,j;t)$ defined in FIG. 1 while those 503 are $A(i,j;t-1)$, $B(i,j;t-1)$, $C(i,j;t-1)$, $D(i,j;t-1)$. The optimum mask calculators 200 are described already in FIG. 2. Their outputs are $Y_k(i,j;t)$ and $Y_k(i,j;t-1)$ respectively for 506 and 505 in which $k=1, 2, 3, 4$. The pixel deviation calculators 300 and moment generators 400 are described in FIG. 3 and FIG. 4. The generator outputs 511, 512, 513, 514 give twelve (12) parameters $D_{pk}$; $p=1, 2, 3$; $k=1, 2, 3, 4$; "representing" the texture image. The parameters are sent to a suitable micro-processor for classification mode or learning.

Firstly, the micro-processor converts the twelve received parameters $D_{pk}$ to another set of twelve parameters, namely $d_{pk}$:

$$d_{1k} = D_{1k} \tag{14}$$

$$d_{2k} = (D_{2k})^{\frac{1}{2}} \tag{15}$$

$$d_{3k} = (D_{3k})^{\frac{1}{3}}/d_{2k} \tag{16}$$

$$k = 1, 2, 3, 4$$

and defines the following feature vector d $$d = [d_{11}, d_{21}, d_{31}, d_{12}, \ldots, d_{34}]^T \tag{17}$$

Our experiences have shown that good results can be obtained by assuming the feature vector be multivariate normal distributed for a given texture $w_j$ and therefore by using the maximum likelihood decision rule. Thus, in classification mode, the micro-processor calculates the following discriminant function $$\Delta_j(d) = (d-m_j)^T \cdot R^{-1} \cdot (d-m_j) + \log |R_j| \tag{18}$$

for each texture $w_j$ which is known a priori in the learning mode.

The micro-processor classifies the considered texture to be class $w_i$ if:

$$\Delta_i(d) = \min_j [\Delta j(d)] \tag{19}$$

In the learning mode, for K texture samples of class $w_j$, the micro-processor estimates the distribution parameters: $m_j$, $R_j$ by the following equations:

$$m_j = \frac{1}{K} \sum_{i=1}^{K} d_i \tag{20}$$

$$R_j = \frac{1}{K} \sum_{i=1}^{K} (d_i - m_j)(d_i - m_j)^T \tag{21}$$

Then it calculates the inverse matrix $R_j^{-1}$ and log $|R_j|$ which are useful in the classification phase.

In some applications where the "real time" is not truly a critical factor it should be economically effective to extract the texture features in a sequential manner.

FIG. 6 illustrates a proposed block diagram of such a sequential extractor. Referring to the drawings, texture image 601 is sent firstly to a frame grabber 600 which holds the image at least for the computation time. The frame grabber output is connected to line and pixel delays 100 which produces necessary parallel outputs 603 for mask calculator 200. The multiplexer 620 selects only one output $Y_k(i,j)$ of mask calculator in order to calculate its three (3) associated parameters $D_{pk}$. When this calculation is finished, multiplexer 620 will select another mask calculator output and so on. The multiplexer output 605 is sent to a sequential parameter calculator 700. This device is designed to obtain firstly the mean $\overline{Y}_k$ which will be held by latch 670 for subsequent calculation and then by a sequential manner the three parameters $D_{1k}$, $D_{2k}$, $D_{3k}$ associated to $Y_k(i,j)$. These parameters will be sent to the micro-processor 500 via latch 660. Thus the multiplexer 640 has to select $Y_k(i,j)$ 605 for the first phase of computation and ROM output 608 for the three other phases. The ROM 630 is a combination of ROM 411, 421, 431 described in FIG. 4. The sub-block 650 is the accumulator 532 and the averager 433. The timing and control 710 produces necessary signals specially for multiplexers 620, 640, ROM 630, latches 660, 670.

The proposed sequential extractor, FIG. 6, is 16 times slower than the parallel extractor illustrated in FIG. 5. There are, of course, other configurations using the same principle, which give a performance between these two speeds or slower.

It should be worthwhile to present herewith some classification results of twelve different texture images taken from P. Brodatz's album "Textures - A Photographic Album for Artists and Designers" Dover NY 1966.

| k Texture size (pixel) | Proposed masks Proposed parameters (12) | | Pairwise sums & Pairwise sums & differences using the same parameters (24) | |
|---|---|---|---|---|
| | Proposed ML | KNN | ML | KNN |
| 34 × 32 | .935 | .790 | .835 | .711 |
| 48 × 48 | .973 | .838 | .928 | .754 |
| 64 × 64 | .990 | .847 | .948 | .782 |

From this experience, the texture size k is preferably chosen to be 4096 for reasons of performance and implementation. Furthermore, the proposed maximum-likelihood (ML) classification yields better results than K-nearest-neighbor (KNN) method. Finally, the proposed masks using twelve parameters of first order distribution gives good performance. Several reasons could explain this behavior: firstly, these masks extract intrinsically two dimensional local features; secondly, these features are uncorrelated and can thus be precisely characterized by moments of their first order distribution.

We claim:

1. An electronic processing system for textural feature extraction of picture pixels, said system comprising a calculator circuit for producing four picture uncorrelated transformed signals from any four original pixels automatically selected in a rectangular pattern, deviation and moments calculator means for analyzing each said transformed signals by measuring the three central moments thereof and generating signal parameters representative of the texture of said pixels, and processing circuit means for converting said signal parameters for use in classification or learning mode.

2. A processing system as claimed in claim 1 wherein said transformed signals are obtained by the following equation:

$$Y_1 = (A + B + C + D)/2$$
$$Y_2 = (A + B - C - D)/2 \quad (7)$$
$$Y_3 = (A - B - C + D)/2$$
$$Y_4 = (A - B + C - D)/2$$

where, A, B, C, and D are the four chosen pixel intensities, and wherein the transformed random variable $Y_1$, $Y_2$, $Y_3$, and $Y_4$ are obtained by diagonalizing the covariance matrix of the four pixels by the formula:

$$C = \sigma^2 \begin{vmatrix} 1 & a & b & c \\ a & 1 & c & b \\ b & c & 1 & a \\ c & b & a & 1 \end{vmatrix}$$

in which $\sigma^2 = E[X(i,j) - \mu^2]$ (2)

$\mu = E[X(i,j)]$ (3)

and a, b, c represent three normalized covariances appropriate to a pair of random variables $X(i+p, j+q)$ and $X(i,j)$, and the diagonalizing matrix of the covariance matrix C by the following $$W = \frac{1}{2} \begin{vmatrix} 1 & 1 & 1 & 1 \\ 1 & 1 & -1 & -1 \\ 1 & -1 & -1 & 1 \\ 1 & -1 & 1 & -1 \end{vmatrix} \quad (4)$$

and from the Walsh Hadamard transform (W) the following properties are obtained:

$$\text{Var}(Y_1) = \sigma^2(1 + a + b + c) \quad (5)$$
$$\text{Var}(Y_2) = \sigma^2(1 + a - b - c)$$
$$\text{Var}(Y_3) = \sigma^2(1 - a - b + c)$$
$$\text{Var}(Y_4) = \sigma^2(1 - a + b - c)$$

$$\text{Cov}(Y_i, Y_j) = 0, i \neq j \quad (6)$$

3. A processing system as claimed in claim 2 wherein said calculator has four parallel inputs connected to four combiner circuits, said combiner circuits having their outputs connected to an input of two of four more combiner circuits, said four more combiner circuits generating said output transformed signals $Y_1$, $Y_2$, $Y_3$, and $Y_4$.

4. A processing system as claimed in claim 2 wherein said deviation and moments calculator means produces a first order histogram moments of said transformed signals by performing each said random variables $Y_1$, $Y_2$, $Y_3$, and Y hd 4

(1) absolute deviation mean:

$$D_{1k} = \frac{1}{M} \sum_{i=1}^{I} \sum_{j=1}^{J} |Y_k(i,j) - \overline{Y}_k| \quad (8)$$

(2) variance:

$$D_{2k} = \frac{1}{M} \sum_{i=1}^{I} \sum_{j=1}^{J} (Y_k(i,j) - \overline{Y}_k)^2 \quad (9)$$

(3) third central moment:

$$D_{3k} = \frac{1}{M} \sum_{i=1}^{I} \sum_{j=1}^{J} (Y_k(i,j) - \overline{Y}_k)^3 \quad (10)$$

where the mean $\overline{Y}_k$ and M number of textural pixels to be considered are given respectively by:

$$\overline{Y}_k = \frac{1}{M} \sum_{i=1}^{I} \sum_{j=1}^{J} Y_k(i,j) \quad (11)$$

$$M = IJ \quad (12)$$

5. A processing system as claimed in claim 4 wherein said processing system is a real time system, said deviatin and moments calculator means comprises a pixel deviation calculator circuit connected to the outputs of said calculator circuits and a central moment generator circuit connected to an output signal of said deviation calculator circuit to calculate the central moment of the output signal of said deviation calculator circuit.

6. A processing system as claimed in claim 5 wherein said pixel deviation calculator circuit comprises a first input having a real time signal $\overline{Y}_k(i,j;t)$ and a second input having a signal $Y_k(i,j; t-1)$ corresponding to a previous frame, said first input being connected to an accumulator having an output connected to an averager which is serially connected to a latch circuit and a subtractor circuit, said second input also being connected to said subtractor circuit, said accumulator and averager circuit calculating the mean $\overline{Y}_k(t)$, said latch circuit preserving the previous mean $\overline{Y}_k(t-1)$, said subtractor producing the pixel deviation signal $Z_k(i,j; t-1)$ at its output.

7. A processing system as claimed in claim 6 wherein said accumulator comprises a combiner and a D flip-flop register, said register having a feedback connection to said combiner.

8. A processing system as claimed in claim 6 wherein said moment generator circuit is connected to said output of said deviation calculator for analysing said pixel deviation mean signal $Z_k(i,j;t-1)$; said moment generator having three parallel branch circuits to calculate said three central moments and namely said absolute deviation mean $D_{1k}$, variance $D_{2k}$, and third central moment $D_{3k}$, each said branches having a read only memory circuit connected in series to an accumulator having an averager connected to an output thereof, said averager being connected to a latch to hold the calculated moments.

9. An electronic processing system as claimed in claim 1 wherein said electronic processing system is a parallel extractor comprising a first and second input to which said pixels are fed, said first and second input being connected to a respective pixel delay circuit, a frame delay circuit connected between said second input and said pixel delay circuit to provide a signal representative of a previous texture pixel, each said pixel delay circuits having four output connections four of which have a delay signal and provide four parallel inputs to feed four adjacent picture pixels to a respective calculator circuit.

10. A processing system as claimed in claim 9 wherein said calculator circuit comprises a combiner circuit arrangement having predetermined input and output connections to provide four output transformed signals, said four transformed signals of each calculator circuit being connected to an associated input connection of four pixel deviation calculators forming part of said deviation and calculator means.

11. A processing system as claimed in claim 10 wherein said deviation and moments calculator means further comprises four moments generator circuits each connected to an output connection of an associated one of said four pixel deviation calculators, each said generators calculating the first three central moments of their input signal to generate three output signals, said three output signals of said four moments generator circuits giving a set of twelve parameters representative of the texture image analysed.

12. A processing system as claimed in claim 11 wherein said processing circuit means is a micro-processor circuit to which said twelve parameters are connected for analysis for converting same in the classification mode and/or learning mode.

13. A processing system as claimed in claim 12 wherein said micro-processor converts said twelve parameters expressed by $D_{pk}$ to another set of twelve parameters $D_{pk}$ wherein:

$$d_{1k} = D_{1k}$$

$$d_{2k} = (D_{2k})^{\frac{1}{2}}$$

$$d_{3k} = (D_{3k})^{\frac{1}{3}}/d_{2k}$$

$$k = 1, 2, 3, 4$$

and defines the following feature vector d
$$d = [d_{11}, d_{21}, d_{31}, d_{12}, \ldots, d_{34}]^T.$$

14. A processing system as claimed in claim 1 wherein there is provided a sequential extractor which comprises a frame grabber to which pixel intensity signals are fed serially and held for computation therein, said frame grabber feeding a pixel delay circuit which provides said four adjacent pixel intensity signals.

15. A processing system as claimed in claim 14 wherein said four adjacent pixel intensity signals are connected to a respective one of four inputs of said calculator circuit to produce said four transformed signals which are fed to a multiplexer circuit in order to calculate its three associated parameters $D_{pk}$ serially, and feed same to a sequential parameter calculator to calculate the mean $D_{pk}$ and sequentially the three parameters $D_{1k}$, $D_{2k}$ and $D_{3k}$ which are then fed to said processing circuit means.

16. A method of analyzing textural features of a texture image, said method comprising the steps of:
(I) producing transformed signals in order to diagonize the covariance matrix between four adjacent picture elements selected in a rectangular pattern on said image,
(II) measuring the three central moments of said transformed signals representative of said four transformed signals, and
(III) generating parameter signals representative of the texture image of said picture elements and processing said parameter signals for use in classification or learning mode.

17. A method as claimed in claim 16 wherein before step (I) comprises:
(a) feeding texture image signals to an input of two line and pixel delay circuits,
(b) delaying one of said texture image signals at an input of one of said delay circuits to provide a previous texture image.

18. A method as claimed in claim 17 wherein said step (I) comprises:
(a) providing two sets of four outwardly uncorrelated output signals, four of which have a frame delay, and connecting each set to a calculator to effect said step (I).

19. A method as claimed in claim 18 wherein said step (III) comprises:
(a) feeding four outputs of said two calculators to an associated one of two inputs of four pixel deviation calculators, and
(b) feeding a single output of said calculators to a respective moment generator circuit.

20. A method as claimed in claim 16 wherein said step (I) comprises:
(a) feeding picture intensity signals serially to a frame grabber citcuit.
(b) feeding said analysed signals to a delay circuit to provide four adjacent and parallel pixel intensity signals.

* * * * *